US006793858B2

(12) United States Patent
Motz

(10) Patent No.: US 6,793,858 B2
(45) Date of Patent: Sep. 21, 2004

(54) METHOD AND APPARATUS FOR FORMING A FLEXIBLE MAT DEFINED BY INTERCONNECTED CONCRETE PANELS

(76) Inventor: James G. Motz, 2341 W. U.S. 22 & 3, Maineville, OH (US) 45039

( * ) Notice: Subject to any disclaimer, the term of this patent is extended or adjusted under 35 U.S.C. 154(b) by 499 days.

(21) Appl. No.: 09/871,285

(22) Filed: May 31, 2001

(65) Prior Publication Data

US 2002/0180076 A1 Dec. 5, 2002

(51) Int. Cl.[7] .......... B32B 31/08

(52) U.S. Cl. .......... 264/172.19; 264/173.1; 264/555; 264/297.6; 264/297.8; 264/257; 264/165; 264/310; 425/435; 425/220

(58) Field of Search .......... 264/172.19, 173.1, 264/651, 55, 5, 171.12, 297.6, 257, 69, 70, 165, 169, 310, 261, 273, 275, 279, 333; 425/435, 220

(56) References Cited

U.S. PATENT DOCUMENTS 3,689,346 A * 9/1972 Rowland .......... 156/245
3,720,493 A * 3/1973 Borcoman et al. .......... 425/111
4,578,301 A * 3/1986 Currie et al. .......... 428/109

* cited by examiner

*Primary Examiner*—Michael Colaianni
*Assistant Examiner*—Michelle Acevedo Lazor
(74) *Attorney, Agent, or Firm*—Alfrerd J. Mangels

(57) ABSTRACT

A method and apparatus for continuously forming flexible mat structure in the form of spaced, interconnected concrete panels. The mat structure can serve as an erosion control mat along the banks of waterways and within drainage ditches and channels, and can also be utilized to provide temporary or permanent walkways and roadways. A rotatable drum includes peripherally-positioned mold cavities that receive concrete mix from a trough supplied from a source of concrete mix. A grid is fed against the drum periphery and over the mold cavities before the concrete mix is introduced, and after the mix is introduced a web of fibrous material is brought into contact with the concrete-mix-containing mold cavities to overlie the concrete-containing surface of the drum. As the drum rotates the fibrous material with overlying, interconnected concrete panels is deposited on the ground to provide the a finished mat structure.

8 Claims, 4 Drawing Sheets

METHOD AND APPARATUS FOR FORMING A FLEXIBLE MAT DEFINED BY INTERCONNECTED CONCRETE PANELS

BACKGROUND OF THE INVENTION

1. Field of the Invention

The present invention relates to a method and apparatus for forming a flexible mat of concrete panels for placement on surface areas at which surface erosion can occur. The mat is defined by a plurality of side-by-side, spaced, interconnected concrete panels. More particularly, the present invention relates to a method and apparatus for continuously forming as a unit a flexible mat defined by a plurality of interconnected concrete panels including flexible interconnections that extend between adjacent panels, for providing pre-formed mats that can serve as walkways or roadways, and that can also serve to provide erosion control along drainage ditches and water channels, and around the banks of bodies of water.

2. Description of the Related Art

The shorelines and banks of lakes, ponds, rivers, and streams often undergo undesirable erosion. Because of the effects of rapidly flowing water or because of periodic changes in water levels, a washing effect results along the shorelines and banks, and that washing effect gradually erodes the surfaces that are contacted by the moving water. Similarly, drainage ditches and drainage channels for carrying away excess surface water also experience considerable undesirable erosion, particularly during and immediately after times of heavy rainfall.

In the past, erosion caused by moving water was attempted to be controlled by placing stones of various sizes along the banks of waterways or within drainage ditches and channels. Such stones, sometimes referred to as rip-rap, were dumped or otherwise irregularly placed in the path of the water movement in an effort to reduce the velocity of the moving water, and thereby minimize the washing-away effect of the water, to prevent the receding of the shorelines of the bodies of water and to reduce the deepening of drainage ditches and channels. However, that attempted solution to the erosion problem was often only a short-term solution, which over time became less and less effective. Because the moving water undermined the earth below the stones by washing away part of the underlying earth, the stones ultimately sank into the earth and became submerged into the resulting silt, thereby becoming ineffective to control erosion over a long period of time.

Various proposals have been made to attempt to solve the erosion problem by a method other than the mere dumping of stones in the water flow path. Some proposals involved erosion control mats formed from interconnected concrete panels of one shape or another. Some of those proposed mats were formed from concrete blocks that included internal passageways within the blocks through which cables or ropes could be threaded to interconnect the concrete blocks in a desired array. Sometimes the blocks were in contact with each other or were in interlocked form. Other proposals included embedding connecting elements within the concrete blocks to avoid the need to provide passageways for cables or ropes, and to avoid the separate step of interconnecting the blocks. However, the proposed structures were difficult to manufacture quickly and economically at a job site, and consequently they were not widely utilized.

In addition to control of erosion caused by moving water, mats formed from side-by-side, interconnected concrete panels can also be utilized to provide walkways, roadways, and parking areas, to control usage-based erosion of the ground in off-road or restricted-usage applications. Additionally, such mats based upon interconnected concrete panels can also be useful to provide more permanent road berms or shoulders, to replace the usual gravel-based berms or shoulders that gradually become eroded and rutted by vehicles wandering off the road. Again, however, pre-formed mats for walkway, roadway, parking, and road berm purposes have heretofore been too costly to produce, In comparison with other alternatives.

The present invention is intended to provide an improved method and apparatus for forming flexible mats made from spaced concrete panels, so that the mats can be quickly and economically produced at or near a job site, to avoid the need to transport the mats over long distances.

SUMMARY OF THE INVENTION

Briefly stated, in accordance with one aspect of the present invention, apparatus is provided for continuously forming a flexible mat that is defined by a plurality of spaced, interconnected concrete panels. The apparatus includes a rotatable drum having a plurality of circumferentially-disposed mold cavities carried at an outer periphery of the drum. A trough overlies the drum and has an elongated outlet opening extending across an axial direction of the drum for providing a substantially uniform flow of a flowable concrete mix into the respective mold cavities as the mold cavities pass beneath the outlet opening. A first support is provided adjacent to the drum for rotatably receiving a roll of open mesh material in web form for feeding the mesh material into contacting engagement with the periphery of the drum and in the drum rotation direction before the trough. A second support is provided adjacent to the drum and behind the trough in the drum rotation direction for rotatably, receiving a roll of a base material in web form for feeding the base material into contacting engagement with the periphery of the drum.

In accordance with another aspect of the present invention, a method is provided for continuously forming a flexible mat defined by a plurality of spaced, interconnected concrete panels. The method includes providing a rotatable drum having a plurality of circumferentially-disposed, peripheral mold cavities. A plurality of longitudinally-extending connector elements and a plurality of transversely-extending connector elements are fed into contacting engagement with the periphery of the drum and in overlying relationship with the mold cavities. The drum is rotated and a flowable concrete mix is deposited into successive mold cavities as the drum rotates to substantially fill the mold cavities to form concrete panels. As the drum is rotating, a web of base material is brought into contacting engagement with the periphery of the drum to overlie and cover the filled mold cavities to prevent concrete mix from falling from the mold cavities as the drum is rotating. The drum is further rotated, and the concrete panels are released from the mold cavities by gravity and are in overlying contact with the web of base material to form a continuous mat having concrete panels that bond to the base material upon curing of the concrete mix, wherein the resulting mat has a predetermined length and width.

Description of the Preferred Embodiments

The method and apparatus herein described can be utilized for forming flexible mats that include side-by-side, interconnected concrete panels. Such mats can serve for erosion control, for providing walkways and roadways, and for other purposes. The mats include a plurality of concrete panels that are spaced from each other and are interconnected by thin, flexible connecting elements that extend between and interconnect adjacent concrete panels.

Figure 1:
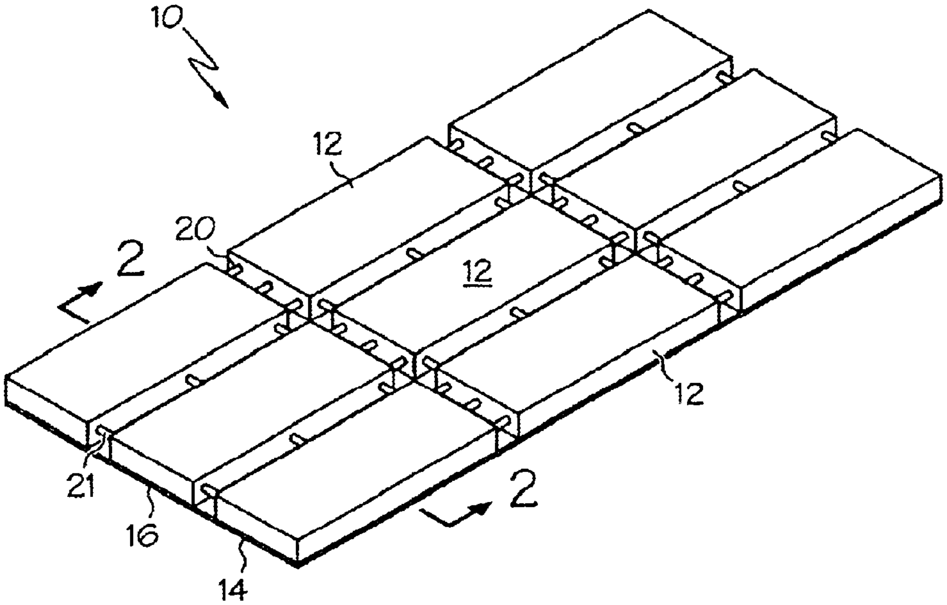
FIG. 1 is a perspective view of a portion of a flexible mat that can be formed by the method and apparatus disclosed herein.
Figure 2:
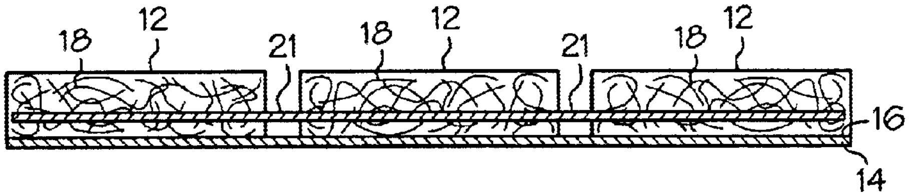
FIG. 2 is a cross-sectional view taken along the line 2—2 of FIG. 1.

Referring now to the drawings, and particularly to FIGS. 1 and 2 thereof, there is shown a portion of a flexible mat 10 that includes a plurality of side-by-side concrete panels 12 that are carried on a fibrous base sheet 14. Concrete panels 12 can be of generally rectangular shape, as shown, and can have longitudinal and transverse cross sections that also are generally rectangular. Although shown in FIG. 1 as of rectangular form, for purposes of illustration, and although described herein as having that form, it should be appreciated that concrete panels 12 can be of any desired outline form with substantially flat and substantially parallel upper and lower faces. In that regard, the outline of panels 12 can be of any desired polygonal shape, from triangular to as many sides as are desired. Additionally, panels 12 can include curved sides and can be in the form of circles, ellipses, ovals, and the like, or they can be defined by a combination of straight-line and curved peripheral elements.

Panels 12 having rectilinear side and end faces can be arranged in a pattern that allows the spacing between adjacent panels to be maintained substantially uniform. Advantageously, panels 12 can be of rectangular form and can be of substantially uniform shape and size. The panels can be spaced from each other a distance of from about ½ inch to about 1 inch or more, as desired, to provide gaps or spaces between the opposed end faces and opposed side faces of adjacent panels, and thereby allow the adjacent panels to pivot relative to each other. Thus, spacing of the ends and sides of adjacent panels from each other allows areas of the resulting mat to flex about the mat's longitudinal and transverse axes, and to conform with any irregularities of the surface onto which the mat is to be placed, so that the mat conforms substantially with the form of that surface.

Concrete panels 12 can be of any convenient or desired overall size. The uniformly-shaped and uniformly-sized panels 12 of rectangular form as shown in FIGS. 1 and 2, for example, can have a thickness of the order of from about 1 inch to about 3 inches for most uses of the mat. However, even thinner or even thicker panels can be provided in those applications of the mat where the compressive loads expected to be imposed upon the concrete panels when in use will either allow or will require. Thus, where the mat is to be placed in a drainage swale or along the bank of a body of water to reduce surface erosion, the compressive load on the panels will be minimal or non-existent, and the panels can be made thinner. On the other hand, where the mat is to be placed on the ground to provide a roadway for vehicles the compressive load on the panels will be considerably higher and the panels must be made thicker if cracking of the panels is to be avoided.

Rectangular panels 12 as shown in FIG. 1 can have a length of the order of from about 3 inches to about 12 inches, and a width also of the order of from about 3 inches, to about 12 inches. Although panels 12 shown in FIG. 1 are positioned so that the respective end faces and side faces of adjacent panels are aligned both longitudinally and transversely, if desired panels 12 can be positioned on base sheet 14 so that the panels in adjacent longitudinally-extending rows of panels are offset from each other, in a staggered relationship.

Concrete panels 12 can be formed from various concrete compositions that can include various types and sizes of aggregate materials, depending upon the surface texture and surface appearance desired on panels 12, the loads to which the panels will be subjected, and also upon the use to which mat 10 is intended to be put. As previously noted, for waterway and drainage ditch erosion control purposes, the concrete panels need not have great strength, because they will not be subjected to high loads when used in such applications, and therefore the concrete composition can be a conventional Class C, air-entrained concrete that is readily available from concrete suppliers.

On the other hand, for roadway and walkway purposes, where panels 12 will be subjected to compressive forces imposed by static or moving loads, the concrete from which the panels are formed can advantageously be a high-strength concrete. For example, a commonly commercially available 5,000 psi, air-entrained, fiber-reinforced concrete can be utilized to form panels intended for mats that provide walkways and roadways, to minimize the tendency for cracking or breaking of the panels under the loads imposed by vehicular traffic. The fibers incorporated in such concrete mixtures can be a plurality of randomly-distributed polymeric fibers 18 (see FIG. 2) of any desired form, such as monofilaments, thin strips, strings, twisted fibers, or the like. The lengths of such fibers can vary from about 2 inches to as much as 8 inches or more, and their diameter, if of circular cross section, or their width, if in the form of strips, can vary from about 0.001 inch to about 0.100 inch, depending upon the cross-sectional shape and the nature of the material from which the fibers are formed.

Concrete panels 12 have a base surface 16 to which fibrous base sheet 14 is bonded. Because panels 12 are each bonded to the upper face of base sheet 14, the sheet also serves to hold concrete panels 12 in the desired spaced relationship relative to each other. Bonding of fibrous sheet 14 to concrete panels 12 can be effected by placing the sheet in contact with freshly-poured concrete and pressing the sheet against the concrete so that the wet concrete penetrates into the spaces between the interengaged fibers that define the base sheet.

Figure 3:
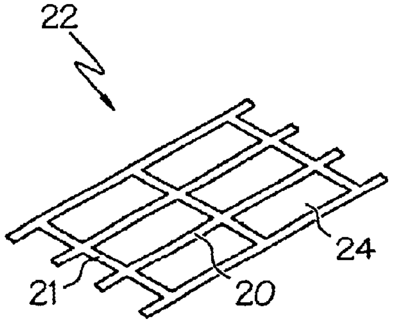
FIG. 3 is a fragmentary perspective view of one form of open mesh sheet that can be utilized in connection with the present invention.

Extending between and interconnecting adjacent concrete panels 12 are a plurality of longitudinally-extending connectors 20 and a plurality of transversely-extending connectors 21 that serve to limit the maximum movement of adjacent interconnected panels away from each other. Connectors 20 and 21 can be provided by a pre-formed, open mesh sheet 22 that can be provided in the form as shown in FIG. 3. Such open mesh sheets are sometimes referred to as "geogrids," and they generally include a regular pattern of spaced, side-by-side, generally rectangular openings 24. Such geogrids are available in various polymeric materials and are available with openings of various sizes. A suitable polymeric geogrid for use in mats of the type described herein can be obtained from Huesker, Inc., of Charlotte, N.C.

Figure 4:
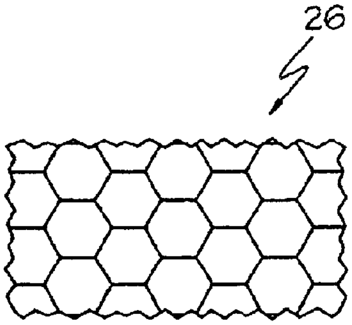
FIG. 4 is a fragmentary top view of another form of open mesh sheet that can be utilized in connection with the present invention.

Open mesh sheet 22 can be formed from various polymeric materials, such as oriented or non-oriented polypropylene, polyethylene, copolymers thereof, and the like. Mesh sheet 22 is bonded to or partially embedded in the respective concrete panels and serves primarily to provide a plurality of interconnection elements that extend between adjacent panels in the form of longitudinally-extending connectors 20 and transversely-extending connectors 21. Instead of polymeric materials, the open mesh sheet can be an open mesh sheet 26 of metallic material, such as a commonly-available wire mesh that can have hexagonal openings, a portion of which is shown in FIG. 4. Alternatively, the concrete panels can be interconnected by longitudinally- and transversely-extending metallic wire strands made from metals that resist corrosion caused by the concrete, such as stainless steel, copper, or other metals that have a protective surface coating that resists corrosion, such as galvanized steel.

Figure 5:
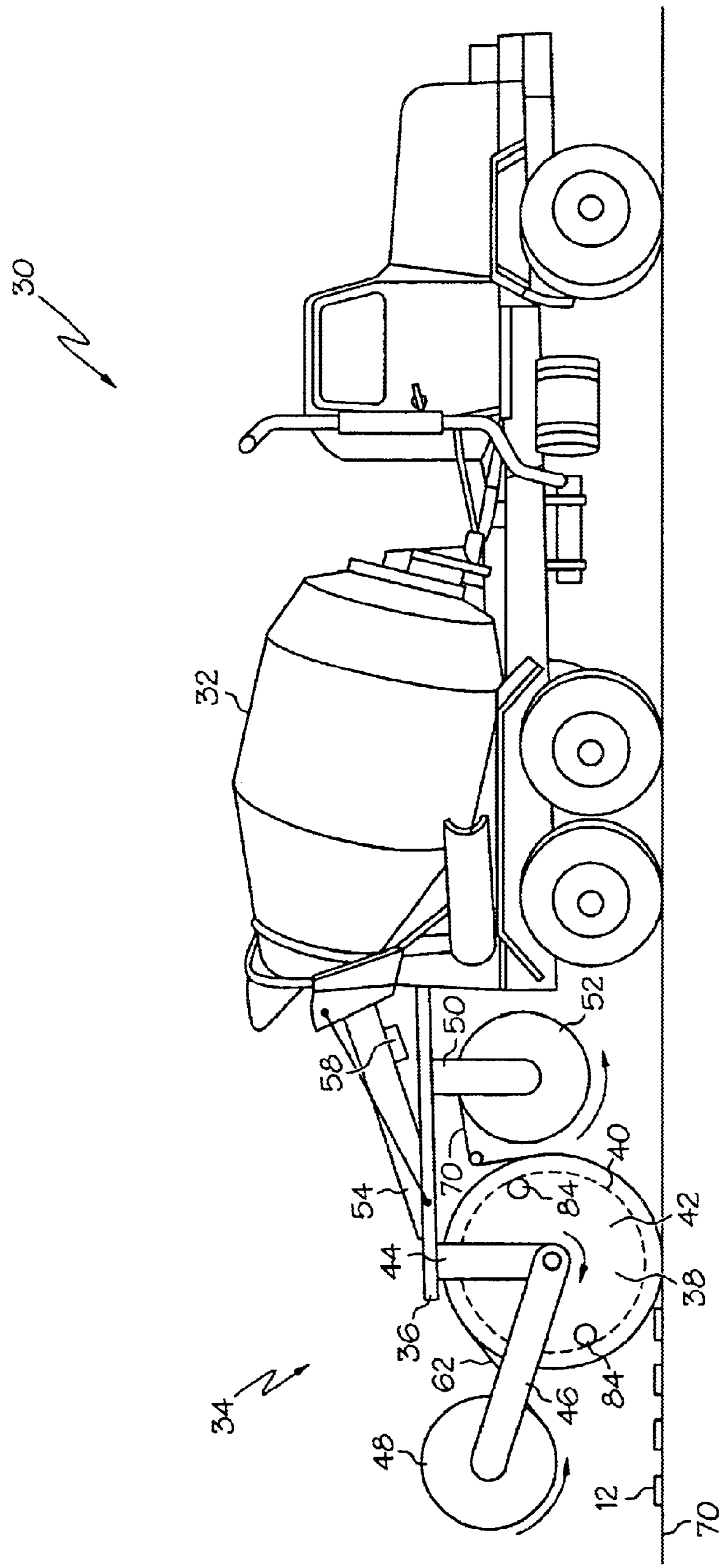
FIG. 5 is a side elevational view of one embodiment of a continuously-operable, flexible-mat-forming apparatus carried at the back end of a concrete mixer truck.

Flexible mats formed from interconnected, side-by-side concrete panels can be made continuously by apparatus of the type shown in FIG. 5. A conventional concrete mixer truck 30 includes a rotatable mixer drum 32 for providing a supply of mixed concrete having the desired composition and consistency. A mat-forming apparatus 34 is carried at the rear of truck 30 and is supported from a pair of parallel, rearwardly extending support beams 36, only one of which is visible in FIG. 5. Mat-forming apparatus 34 receives concrete from mixer drum 34 to form mats having side-by-side, interconnected concrete panels.

Mat-forming apparatus 34 includes a rotatable, mold-carrying drum 38 that includes on its periphery a plurality of rectangular molds having a predetermined, uniform depth. Drum 38 is a hollow structure defined by a cylindrical outer surface 40 and a pair of spaced end walls 42, only one of which is visible in FIG. 5. Drum 38 is rotatably supported on suitable bearings (not shown) that are carried by a support frame defined by a pair of spaced, parallel support columns 44, only one of which is visible in FIG. 5, which extend downwardly from respective support beams 36.

Positioned rearwardly of mold drum 38 and rotatably supported by a pair of spaced, parallel support beams 46 that extend rearwardly from respective support columns 44 is a grid roll 48. Roll 48 can be a polymeric geogrid in web form, such as geogrid 22 having a configuration such as that shown in FIG. 3, or it can be a metallic grid, having a configuration such as that of metallic grid 26 shown in FIG. 4.

Positioned forwardly of mold drum 38 and rotatably supported by a pair of spaced, parallel support columns 50 is a fabric roll 52. Roll 52 can be a roll of fibrous material in web form to provide the base sheet shown in FIGS. 1 and 2 as base sheet 14.

Figure 6:
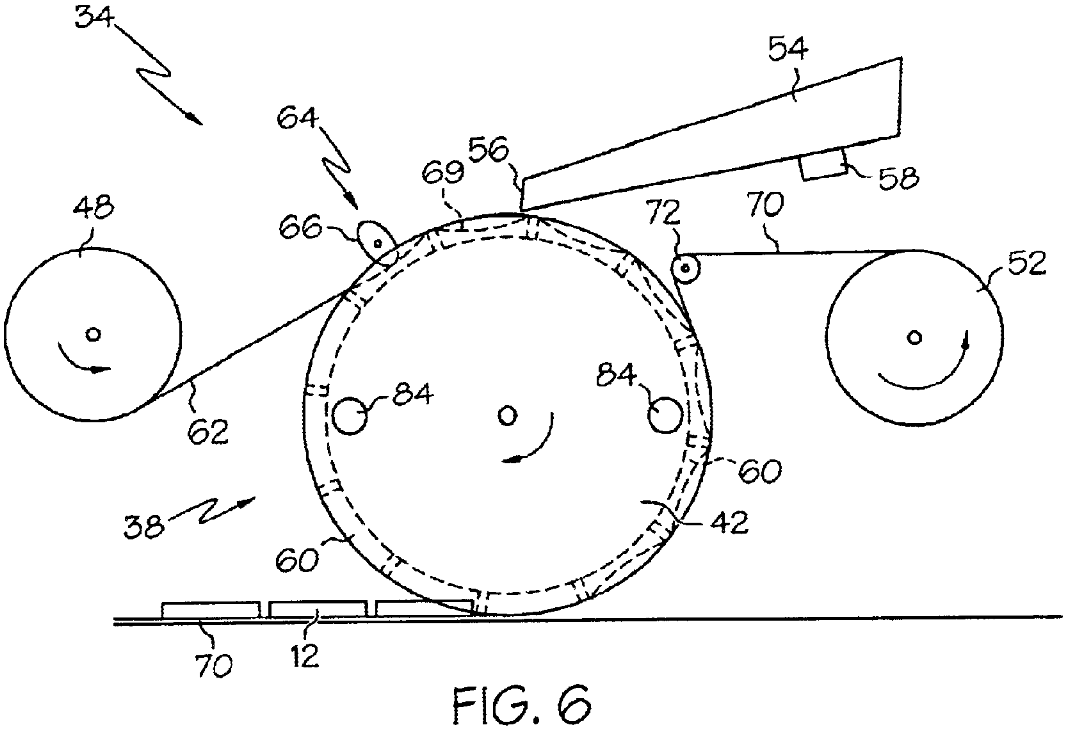
FIG. 6 is an enlarged side elevational view of the mat-forming apparatus shown in FIG. 5.

Referring to FIG. 6, extending from an outlet in mixer drum 32 is a trough 54 that is inclined downwardly from the mixer drum outlet and that terminates in a trough outlet 56 positioned above the upper periphery of mold drum 38. Trough 54 is adapted to convey the concrete mix from the mixer drum outlet to the respective molds carried on the periphery of mold drum 38. In that regard, trough outlet 56 has a width that corresponds with the axial length of drum 38, to evenly distribute the concrete mix across the periphery of mold drum 38. A vibrator 58 can be provided on the underside of trough 54 to induce and to maintain a relatively steady flow of the concrete mix received in trough 54 from the mixer drum outlet, so the concrete mix flows downwardly along trough 54 to trough outlet 56. Vibrator 58 also serves to distribute the concrete mix laterally across trough 54, to provide relatively uniform volumetric flow of concrete mix across the width of trough outlet 56.

In operation, concrete mix flows into the upper portion of trough 54 and is distributed laterally by the vibrations induced in the trough by vibrator 58 so that the concrete mix is substantially uniformly distributed across trough outlet 56. The concrete mix flows from trough outlet 56 onto mold drum 38 and into respective mold cavities 60 provided on the cylindrical periphery of mold drum 38. Rotation of drum 38 is effected by resting drum 38 on the ground and moving mat-forming apparatus 34 in a direction from left to right as viewed in FIG. 6. When attached to a cement mixer truck as shown in FIG. 5, forward movement of the truck will cause mold drum 38 to rotate, as a consequence of which the respective mold cavities will be successively supplied with concrete mix as drum 38 rotates.

Figure 8:
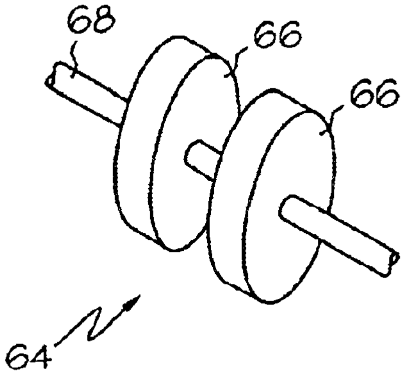
FIG. 8 is a fragmentary perspective view of one form of rotary pressing device for pressing portions of the open mesh sheet into the peripheral mold cavities carried by the rotatable drum.

Before commencing the flow of concrete mix into mold cavities 60, the leading edge of a web 62 of grid material carried by grid roll 48 is suitably attached to the outer periphery of mold drum 38 so that grid material web 62 overlies the respective mold cavities and rotates with the mold drum. If desired, a pressing device 64 in the form of rotatable eccentric members 66 can be provided adjacent the outer periphery of mold drum 38 at a point between grid roll 48 and trough outlet 56. One form of pressing device 64 is shown in FIG. 8, which can have a plurality of side-by-side, cam-like eccentric members 66 that are carried on rotatable shaft 68. Cam-like members 66 are disposed so that they rotate about the axis of shaft 68 in timed relationship with the rotation of mold drum 38 so that the peripheral surfaces of members 66 contact grid material web 62 and press it inwardly into the respective mold cavities 60 so that the grid material web will be more deeply embedded in and at least partially covered by the concrete mix when the concrete mix is introduced into mold cavities 60. In that regard, cam-like members 66 preferably have a shape such that they cause successive portions of grid material to be pressed into successive mold cavities 60 to recessed position 69 shown in FIG. 6. Accordingly, the size and shape of cam-like members 66 will be dependent upon the mold cavity depth and the mold cavity length along the periphery of mold drum 38. However, it should be appreciated that a pressing device is an optional element of mat-forming apparatus 34.

Also before commencing the flow of concrete mix into mold cavities 60, a controlled flow of water, with or without a suitable release agent, is introduced into each of the mold cavities. The water flow serves to loosen any concrete mix that may have adhered to the surfaces of the mold cavities 60 during a previous rotation of mold drum 38, and it also serves to wet the mold cavity surfaces to aid in the release of the concrete panels when they are to be removed from the mold cavities. Additionally, if sufficient water is provided, the concrete mix that contacts the wetted mold cavity surfaces will be wetter than the concrete mix within the interior of the mold cavity, which can provide a rougher, stucco-like surface on the concrete panels, which may be desirable for particular applications or by particular users.

Referring once again to FIG. 6, as mold drum 38 rotates clockwise past trough outlet 56, fabric web 70 is placed against the outer peripheral edges of mold cavities 60. Fabric web 70 passes over an idler roll 72 to smooth the fabric web in a lateral direction by minimizing any wrinkles that may exist in the web, after which fabric web 70 contacts the outermost edges of the respective mold cavities 60, to successively overlie each of the mold cavities after they have been filled with concrete mix and to rotate with mold drum 38. As mold drum 38 continues to rotate and the mold cavities pass to and approach the ground, fabric web 70 serves as a barrier to hold the concrete mix in the respective mold cavities and to prevent the concrete mix from falling out of the mold cavities. In the process, the outermost surface of the concrete mix within the respective mold cavities contacts the opposed surface of the fabric web, and some of the concrete mix flows into the interstices between the fabric strands that define fabric web 70. As a result, a bond forms between the concrete mix and the fabric web when the concrete cures. As mold drum 38 continues to rotate, fabric web 70 comes into contact with the ground and concrete panels 12 are successively released from the respective mold cavities 60 so that the resulting concrete-panel-containing mat is deposited on the ground.

Figure 7:
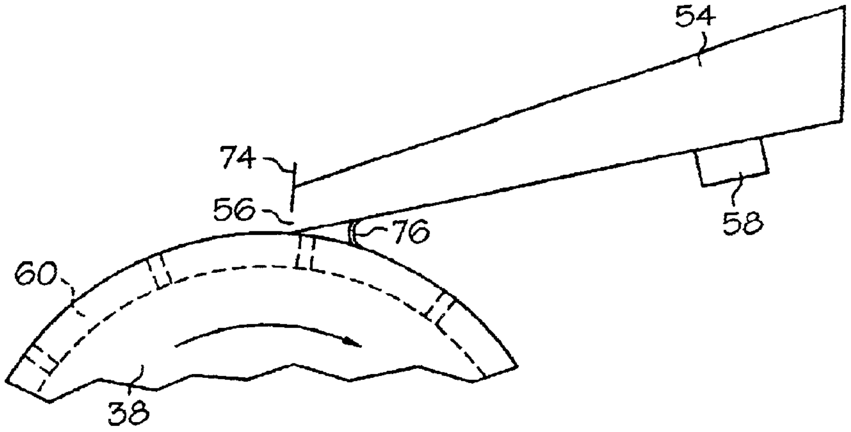
FIG. 7 is a fragmentary side elevational view showing the position of the outlet opening of a concrete feed trough relative to a rotatable drum having a plurality of peripherally-disposed mold cavities.

Control of the concrete mix flow rate is effected by raising or lowering the trough outlet gate 74 shown in FIG. 7. As will be appreciated, the position of outlet gate 74, and consequently the concrete mix flow rate, is dependent upon the viscosity of the concrete mix, the angle of inclination of trough 54, and the volume and the number of mold cavities 60. As also shown in FIG. 7, a flexible wiper 76 can be provided on the underside of trough 54, to bear against the outermost periphery of mold drum 38 in order to smooth the concrete mix that has been deposited into the respective mold cavities, and also to provide a uniform thickness of concrete mix across and around the mold drum periphery by deflecting any excess concrete mix into successive subsequent mold cavities as mold drum 38 rotates.

Figure 9:
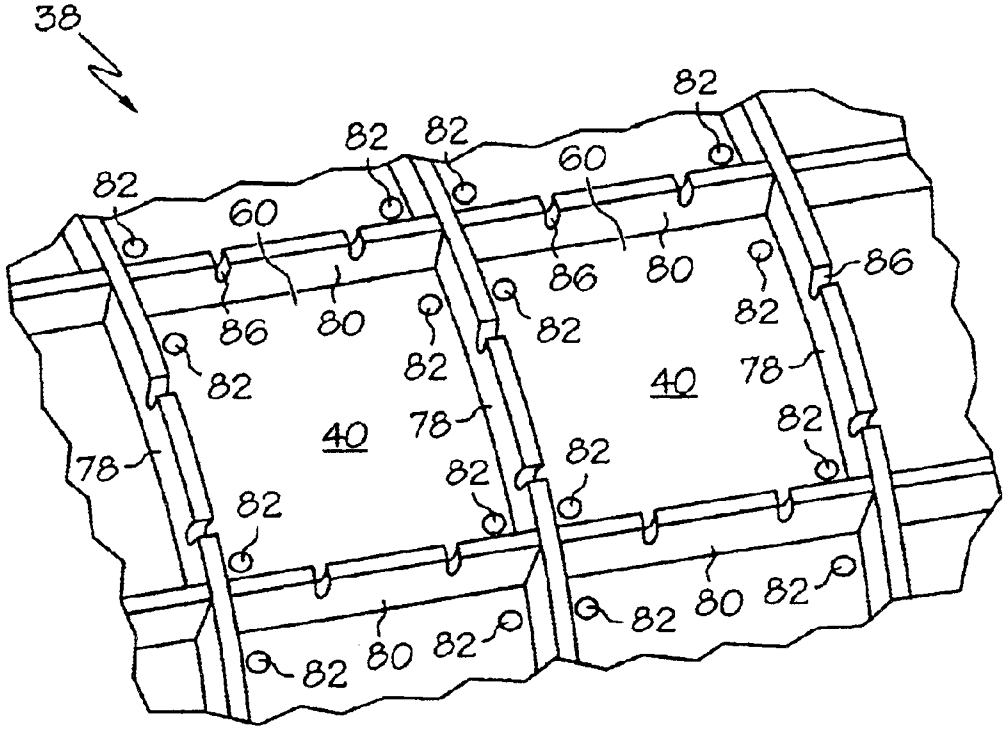
FIG. 9 is a fragmentary perspective view of a portion of the peripheral surface of the rotatable drum, showing the form and arrangement of several adjacent mold cavities.

The form of the peripheral mold cavities 60 provided in mold drum 38 is shown in greater detail in FIG. 9. The drum periphery includes cylindrical drum surface 40, from which extend radially outwardly a plurality of aligned, circumferentially-extending mold side walls 78 that are parallel to each other, and a plurality of aligned, transversely-extending mold end walls 80 that are parallel to each other. Each of mold cavity side walls 78 and mold cavity end walls 80 intersect to define the size and shape of mold cavities 60. As also shown in FIG. 9, cylindrical drum surface 40 includes a plurality of openings 82 that are distributed over the surface so that each mold cavity 60 includes several such openings. The openings are provided to allow water within the mold cavities to drain into the interior of mold drum 38, from which the water can exit the drum through openings 82 in those mold cavities that are at the lowermost position of the drum and adjacent to the ground. Any excess water can exit through drain openings 84 provided in drum end walls 42 (see FIG. 6).

In addition to allowing drainage of water, openings 82 in mold cavities 60 also facilitate separation of concrete panels 12 from the mold cavities by preventing the formation of a vacuum lock between the radially innermost surface of a concrete panel and cylindrical drum surface 40. Without openings 82 to allow air into the mold cavities as the concrete panels are released from mold drum 38, the concrete panels might be difficult to separate cleanly from drum surface 40 and portions of the panel upper surface could be retained within mold cavities 60. Thus, openings 82 allow air to enter mold cavities 60 as the weight of a green concrete panel tends to draw the panel by gravity away from drum surface 40.

In addition to the suitability of pre-formed grids of polymeric or metallic material for embedment within the concrete panels, individual filaments or wires can be furnished to provide the connectors that extend between adjacent concrete panels. The filaments or wires can be disposed lengthwise of the mat by substituting individual rolls of filaments or wires for grid roll 48. And to enable the filaments or wires to be embedded in the concrete panels, the mold cavities defined by mold side walls 78 and mold end walls 80 can include wire-receiving notches or recesses 86, as shown in FIG. 9. The notches receive the filaments or wires so that they lie at a greater distance from fabric web 70 at a point within the respective concrete panels.

Flexible mats in accordance with the present invention can be provided in any desired size, depending upon the use to which the mat is intended to be put. For example, if intended to be utilized to provide permanent or temporary walkways, the mat can have a width of three to five feet or so. If provided as a permanent or temporary roadway, such as intended for use in fields that have poor drainage, two five foot wide sections can be placed side to side, if desired, or an eight foot wide section can be provided to form a roadway to permit access across the field. The axial length of mold drum 38 can be selected to provide mats having the desired width.

Although particular embodiments of the present invention have been illustrated and described, it would be apparent to those skilled in the art that various changes and modifications can be made without departing from the spirit of the present invention. Accordingly, it is intended to be encompassed within the appended claims all such changes and modifications that fall within the scope of the present invention.

What is claimed is:

1. A method for continuously forming a flexible mat defined by a plurality of spaced, interconnected concrete panels, said method comprising:

a. providing a rotatable drum having a plurality of circumferentially-disposed, peripheral mold cavities;

b. feeding a plurality of longitudinally-extending connector elements and a plurality of transversely-extending connector elements into contacting engagement with the periphery of the drum and in overlying relationship with the mold cavities;

c. rotating the drum;

d. depositing a flowable concrete mix into successive mold cavities as the drum rotates to substantially fill the mold cavities to form concrete panels;

e. as the drum is rotating, bringing a web of base material into contacting engagement with the periphery of the drum to overlie and cover filled mold cavities to prevent concrete mix from falling from the mold cavities as the drum is rotating; and f. continuing to rotate the drum so that the concrete panels are released from the mold cavities by gravity and are in overlying contact with the web of base material to form a continuous mat having concrete panels that bond to the base material upon curing of the concrete mix, wherein the resulting mat has a predetermined length and width.

2. A method in accordance with claim 1, including the step of providing release openings in a mold cavity surface to allow free release of the concrete panels from the mold cavities as the drum outer surface rotates to approach its lowermost position.

3. A method in accordance with claim 1, including the step of pressing the connector elements into the mold cavities to allow the concrete mix to overlie and enclose a portion of the connector elements.

4. A method in accordance with claim 1, including providing a trough above the rotatable drum for feeding concrete mix into the respective mold cavities as the drum rotates.

5. A method in accordance with claim 4, including the step of vibrating the trough to induce flow of concrete mix therealong in a substantially uniform volume rate of flow across the rotating drum.

6. A method in accordance with claim 1, wherein the connector elements are provided by an open mesh web.

7. A method in accordance with claim 1, including the step of intermixing a plurality of fibers into the concrete mix to interengage with the connector elements when the concrete mix is introduced into the mold cavities.

8. A method in accordance with claim 1, including the steps of resting the periphery of the drum on the ground, and rotating the drum while its periphery is in contact with the ground to deposit the resulting mat directly on the ground.

* * * * *